United States Patent [19]
Gurney et al.

[11] Patent Number: 5,654,989
[45] Date of Patent: Aug. 5, 1997

[54] METHOD AND APPARATUS FOR SYMBOL TIMING TRACKING

[75] Inventors: David Paul Gurney, Algonquin; James Robert Kelton, Oak Park, both of Ill.

[73] Assignee: Motorola, Inc., Schaumburg, Ill.

[21] Appl. No.: 552,684

[22] Filed: Nov. 3, 1995

[51] Int. Cl.$^6$ .................. H04L 7/00; H04B 3/46; H04B 17/00

[52] U.S. Cl. .................. 375/355; 364/724.04; 327/142; 375/226

[58] Field of Search .................. 375/224, 226, 375/228, 355, 357; 369/724.01; 327/142; 370/105.3, 100.1, 503, 516

[56] References Cited

U.S. PATENT DOCUMENTS

| | | | |
|---|---|---|---|
| 4,633,193 | 12/1986 | Scordo | 375/357 |
| 5,204,879 | 4/1993 | McConnell | 375/228 |
| 5,383,188 | 1/1995 | Shigemoto | 370/105.3 |
| 5,528,634 | 6/1996 | Griph et al. | 375/355 |
| 5,535,252 | 7/1996 | Kobayashi | 375/355 |

OTHER PUBLICATIONS

Sollenberger, Nelson R. et. al., "Low-Overhead Symbol Timing and Carrier Recovery for TDMA Portable Radio Systems", IEEE Transactions on Communications, vol. 38 No. 10, pp. 1886–1892, dated Oct., 1990.

Chuang, Justin C. I. et al. "Burst Coherent Demodulation with Combined Symbol Timing, Frequency Offset Estimation, and Diversity Selection", IEEE Transactions on Communications, vol. 39 No. 7, pp. 1157–1164, dated Jul. 1991.

*Primary Examiner*—Curtis Kuntz
*Assistant Examiner*—Paul Loomis
*Attorney, Agent, or Firm*—Jordan C. Powell

[57] ABSTRACT

An apparatus and method for symbol timing tracking has a decimation index input (42). The decimation index (42) is connected to an upper threshold limiter (44) and a lower threshold limiter (46). The upper threshold limiter (44) is connected to an upper shift register (48). A plurality of cells (52) in the upper shift register (48) are connected to a majority vote logic circuit (54). The majority vote logic circuit (54) is connected to a symbol clock time base (56) and a clocking and clearing control circuit (62). The clocking and clearing control circuit (62) has a clock enable output and a clear signal connected to the upper shift register (48). The lower threshold limiter (46) is connected to a lower shift register (58) that is connected to a second majority vote logic circuit (60).

10 Claims, 4 Drawing Sheets

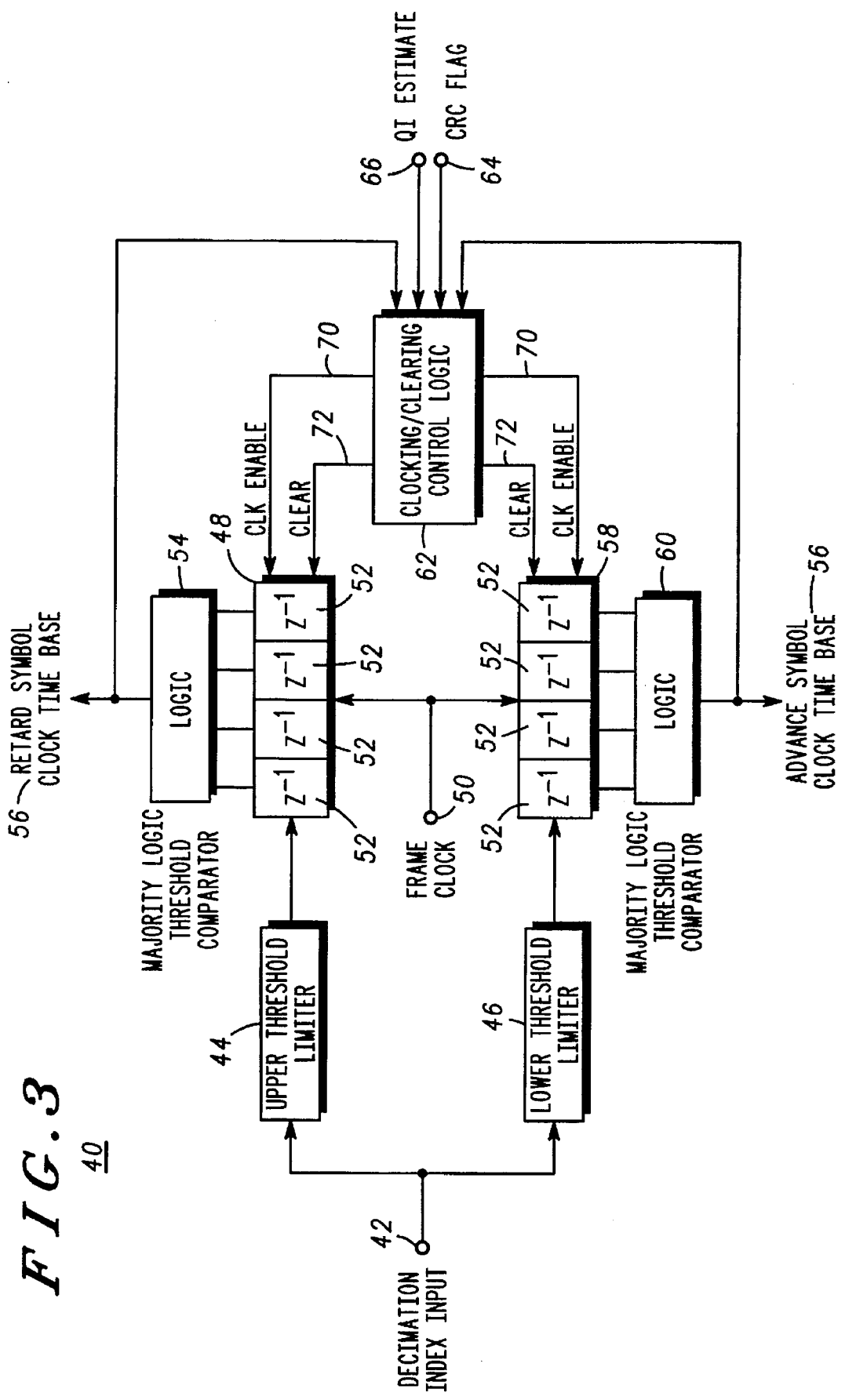

METHOD AND APPARATUS FOR SYMBOL TIMING TRACKING

FIELD OF THE INVENTION

The present invention relates generally to field of digital communications and more specifically to a method and apparatus for symbol timing tracking.

BACKGROUND OF THE INVENTION

In a digital communications system, the carrier frequency is partitioned in time. Each partition represents one symbol. The transmitter modulates each partition with one of the symbols based on the input data to be transmitted. One digital modulation scheme is phase shift keying (PSK). PSK shifts the phase of the carrier to encode either a zero or a one. For instance, the phase of the carrier at the start of the partition is zero degrees if a zero is to be transmitted and the phase is 180 degrees if a one is to be transmitted. The receiver needs to know when the symbols are suppose to change to determine which symbol was sent.

In conventional, digital communication systems the transmitter sends a known pattern of symbols, called a synchronization pattern, before transmitting the data. The synchronization pattern allows a phase lock loop at the receiver to lock onto the phase of the transmitter's carrier. Once the phase lock loop has locked onto the phase it can be used to determine where the symbols change and when the symbol should be sampled. Sampling at the proper time is vital to reducing the bit error rate at the receiver. This system works fine when the data string sent is considerably longer than the synchronization pattern. However, with modern time division multiple access (TDMA) schemes each carrier is divided into multiple time slots. This allows more efficient use of the available spectrum, by allowing several users to access the same carrier. The time slots are short to allow voice communications to be transmitted without any noticeable delay. Using a synchronization pattern to allow a phase lock loop to track the phase of the carrier, requires a significant amount of the slot time, which only leaves a very limited amount time for data to be transmitted during each slot. This can defeat the whole purpose of using TDMA.

One solution to the above problem has been to asynchronously sample the received signal at a rate sufficient to have multiple samples per symbol. This eliminates the need for the synchronization pattern. Each of the sample points is subtracted from a sample point delayed one symbol to obtain a differential phase sample. For a communication system using PSK modulation the differential phase should be either zero or 180 degrees. Noise and inter-symbol interference result in deviations from these ideal phases. By adding up the deviations for each of the possible sample points over a substantial portion of the time slot, it is possible to determine which of the sample points has the minimum deviation. This sample point is chosen to sample the symbols. However if the timing of the receiver's clock or transmitter's clock is off this will show up as a drift that cannot be corrected using the above Scheme. This will tend to result in more errors at the beginning and end of the slot.

Thus there exists a need for a method and apparatus that does not require a synchronization pattern and can adjust for drift in the receiver's or transmitter's clock.

BRIEF DESCRIPTION OF THE DRAWINGS

FIG. 3 is a block diagram of another embodiment of an apparatus for symbol timing tracking;

DETAILED DESCRIPTION OF THE DRAWINGS

In summary, the present invention provides an apparatus and method for symbol timing tracking using a feedback mechanism. The invention allows the receiver to track the timing of symbols as they are received so that they can be reliably decoded. In a preferred embodiment, the apparatus takes eight samples of a symbol as it is received and generates a sampling indicator that indicates the best sampling point of a symbol. The sampling indicator is compared to a predetermined range. Best tracking occurs when the best sample is near the center of the eight samples. Therefore, the predetermined range may be "within the center two samples", i.e. for samples 0 through 7, the predetermined range is 3–4, inclusive. If the sampling indicator is outside the predetermined range (i.e. the best sample is not sample 3 or 4) and a signal quality measure that measures the quality of the received RF signal carrying the symbols meets a quality requirement, a clock time base is adjusted. If the sampling indicator is within the predetermined range or the signal quality measure does not meet a quality requirement, the clock time base is not adjusted. The signal quality measure is employed because it is undesirable to make an adjustment to symbol timing tracking if the received RF signal is of poor quality since the sampling indicator may be unreliable for that signal.

Figure 1:
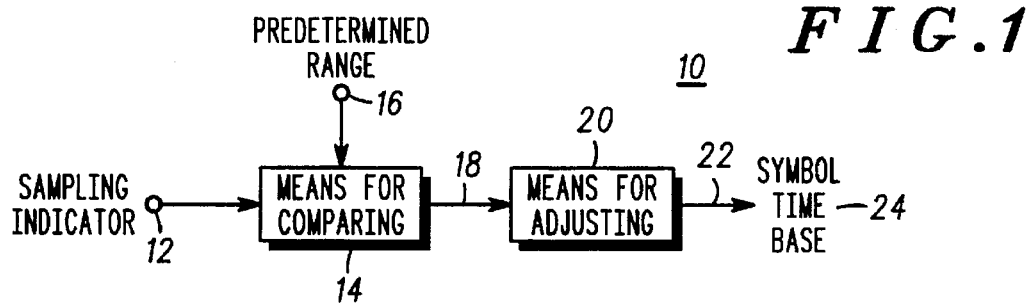
FIG. 1 is a block diagram of an apparatus for symbol timing tracking.

FIG. 1 shows an apparatus 10 for symbol timing tracking. The sampling indicator 12 is one input to a means for comparing 14. The other input is a predetermined range 16 that determines the acceptable values for the sampling indicator 12. The means for comparing 14 has an output 18 coupled to a means for adjusting 20. If the sampling indicator 12 is outside the predetermined range 16 then the means for adjusting 20 has an output 22 signal that adjusts a symbol clock time base 24.

Figure 2:
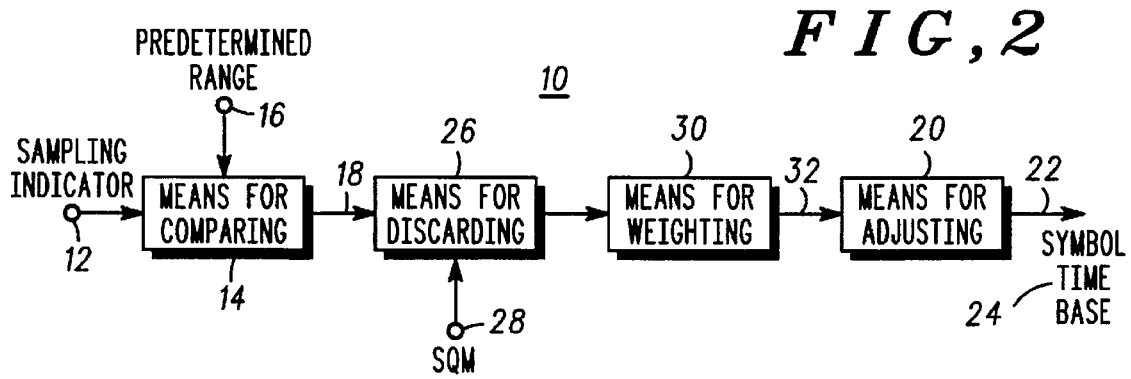
FIG. 2 is a block diagram of another embodiment of an apparatus for symbol timing tracking.

FIG. 2 is another embodiment of the apparatus 10 for symbol timing tracking and further includes a means for discarding 26 coupled to the output 18 of the means for comparing 14. The means for discarding 26 receives a signal quality measure (SQM) 28 and if the signal quality measure 28 does not meet a quality requirement, the output 18 from the means for comparing 14 is discarded. When the signal quality measure 28 does meet the quality requirement, the output 18 is passed through to a means for weighing 30. The means for weighing essential performs a filtering operation on the output 18. The means for weighing 30 compares the number of times the means for comparing 14 determines the symbol clock time base 24 needs to be adjusted to the number of times the symbol clock time base 24 does not need to be adjusted. When this ratio reaches a certain level a signal 32 is sent to the means for adjusting 20 to adjust the symbol clock time base 24 accordingly.

FIG. 3 is another embodiment of an apparatus 40 for symbol timing tracking. In this embodiment, the sampling indicator 12 has been replaced with a decimation index 42. In this case the sampling clock samples the incoming symbols eight times per symbol. The decimation index 42 defines which of the eight samples per symbol is the best sample point for the time slot. The decimation index 42 is calculated by finding the differential phase for each sample point. This is accomplished by subtracting each sample point from the same sample point for the previous symbol. In the preferred embodiment, the modulation scheme used by the transmitter is π/4 differential quadrature phase shift keying (π/4 DQPSK). As a result the ideal phase differences will be π/4, 3π/4, −π/4 and −3π/4. The deviations from this ideal for each sample point are added up over a substantial portion of the received slot. The sample point with the lowest cumulative deviation (phase error) is selected as the sample point or decimation index.

The decimation index 42 (an integer designating which of the eight samples is best) is then compared to an upper threshold limiter 44 and a lower threshold limiter 46. The upper threshold limiter 44 and lower threshold limiter 46 comprise the means for comparing 14, of FIGS. 1 and 2. When the decimation index 42 is higher than the upper threshold, in this example greater than 4, then a logical one is shifted into an upper threshold register 48, otherwise a logical zero is shifted into the upper threshold register 48. The logical one or zero is shifted into the upper register based on a frame clock 50 (i.e., once per frame). The upper shift register has a plurality of cells 52, four in this case. A majority vote logic circuit 54 determines when a predetermined percentage, in this case 3 of 4 of the cells 52, have logical ones and sends a signal to retard the symbol clock time base 56. The lower threshold limiter 46 shifts a logical one into a lower shift register 58 when the decimation index 42 is less than a lower threshold, 3 in this example. A logical zero is shifted into the lower shift register when the decimation index 42 is greater than the lower threshold. The lower shift register 58 has a plurality of cells 52 coupled a second majority vote logic circuit 60. When a predetermined percentage, in this case 3 of the 4 of the cells 52 in the lower shift register 58 are logical ones, the second majority vote logic circuit 60 sends a signal to advance the symbol time base 56. The symbol time base 56 is advanced by some fraction of the symbol time. The shift registers 48, 58 and the majority vote logic circuits 54, 60 act as the means for weighing 30 in FIG. 2, or as a filtering operation.

A clock enable circuit 62 also includes a clearing logic circuit 62. The clock enable circuit 62 has a pair of inputs, a cyclical redundancy code signal 64 and a carrier impairment signal (QI estimate) 66. These two signals are grouped together as a signal quality measure. The CRC signal 64 indicates whether the received slot passed the CRC test. The CRC is a sophisticated error checking scheme that adds some parity bits (CRC bits) to the transmitted slot. If the slot is transmitted error free then the protected slot data divided by the CRC generator will have a zero remainder and the CRC signal 64 will be clear (not set). The carrier impairment signal 66 is proportional to the cumulative phase error for the selected sample point or decimation index 42. More specifically, the carrier impairment signal 66 is equal to one minus the normalized cumulative differential phase error for the decimation index. When either the CRC signal 64 indicates a failure to pass the CRC test or the carrier impairment signal 66 is less than a predetermined threshold, then the clock enable circuit 62 clears a clock enable signal 70. As a result, the output from the upper and lower limiters 44, 46 are discarded. The clock enable circuit 62 performs the function of the means for discarding 26 in FIG. 2.

The clearing logic circuit 62 has a pair of inputs from the majority vote logic circuits 54, 60. When the majority vote logic 54 for the upper shift register 48 sends a signal to retard the symbol clock time base 56, then the clearing logic circuit 62 clears a predetermined number of cells in the upper shift register 48 via a clear signal 72. In the preferred embodiment the oldest two cells of the upper shift register 48 are cleared. This allows the apparatus 40 to adapt more quickly to the new (adjusted) timing estimate.

The apparatus 40 can be used with any apparatus (algorithm) that estimates the decimation index, and not just the algorithm described above. The apparatus 40 can be implemented as discrete components or in a field programmable gate array or in an application specific integrated chip (ASIC) or in a general purpose processor as either firmware or software. In the preferred embodiment, the apparatus is implement in an ASIC as part of a digital receiver for a cable telephony system.

Figure 4:
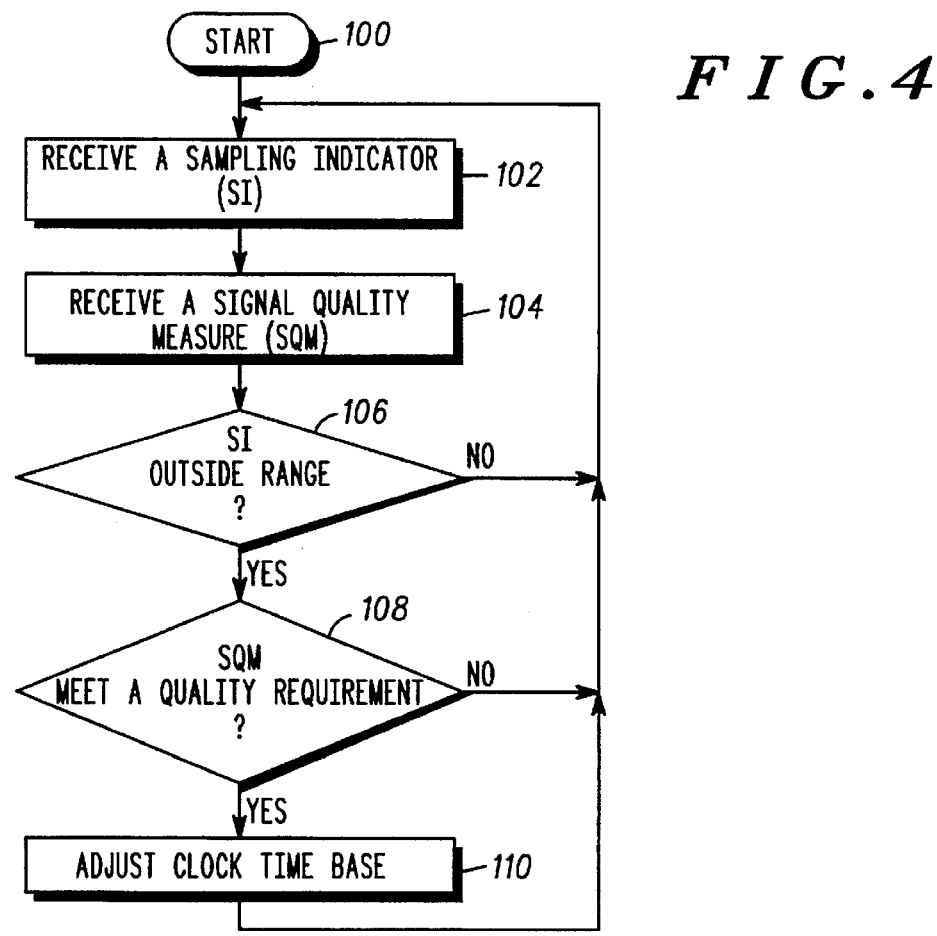
FIG. 4 is a flow chart of a method for symbol timing tracking.

FIG. 4 shows a flow diagram of a method for symbol timing tracking. The process starts at block 100 and then receives a sampling indicator (SI), at block 102. Next, a signal quality measure (SQM) is received at block 104. At block 106, it is determined if the sampling indicator is outside a predetermined range. When the sampling indicator is within the predetermined range at block 106, the process returns to block 102. When the sampling indicator is outside the predetermined range, it is determined if the signal quality measure meets a quality requirement, at block 108. When the signal quality measure does not meet the quality requirement, the process returns to block 102. When the signal quality measure does meet the quality requirement, then the clock time base is adjusted at block 110. From block 110, the process returns to block 102.

Figure 5:
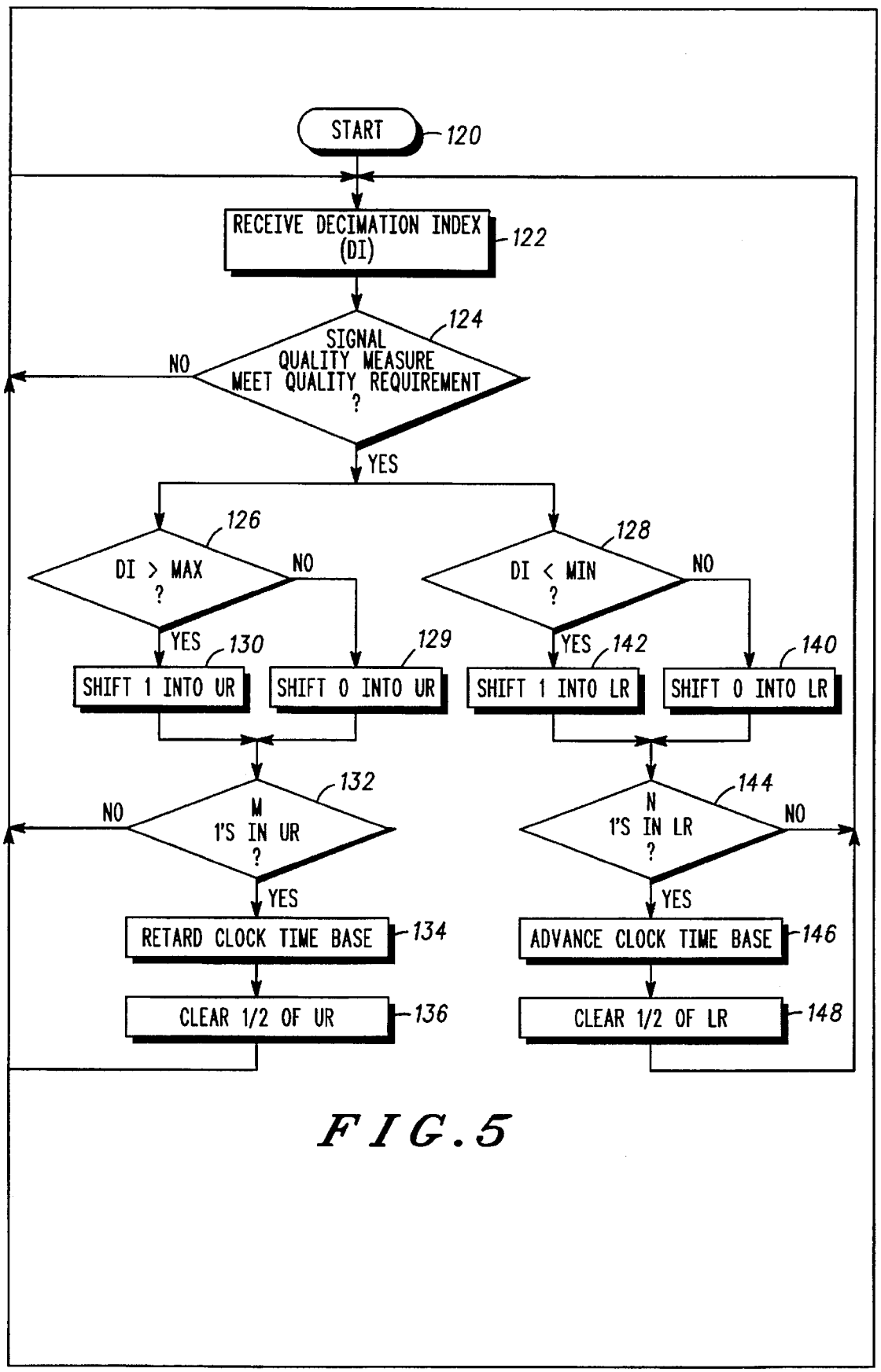
FIG. 5 is a flow chart of another method for symbol timing tracking.

FIG. 5 shows an alternative embodiment of the process shown in FIG. 4. The process starts at block 120, and then receives a decimation index at block 122. Next it is determined if a signal quality measure meets a quality requirement, at block 124. When the signal quality measure does not meet the quality requirement, the process returns to block 122. When the signal quality measure meets the quality requirement, the process continues along parallel paths starting at blocks 126 or 128. At block 126, it is determined if the decimation index is less than a upper value. When the decimation index is less than the upper value, a logical zero is shifted into the upper register, at block 129. When the decimation index is greater than the upper value, a logical one is shifted into the upper register, at block 130. At block 132, it is determined if a predetermined percentage of logical ones is in the upper register. When the predetermined percentage (3 out of the last 4 in the preferred embodiment) of logical ones is not in the upper register, the process returns to block 122. When the predetermined percentage of logical ones is in the upper register, the clock time base is retarded at block 134. A predetermined percentage (i.e., the second half) of the upper register is cleared at block 136. Processing then returns to block 122.

Block 128 compares the decimation index to a lower value. When the decimation index is not less than the lower value, a logical zero is shifted into the lower register, at block 140. When the decimation index is less than the lower value, a logical one is shifted into the lower register, at block 142. At block 144, it is determined if a predetermined percentage of logical ones is in the lower register. When the predetermined percentage of logical ones is not in the lower register, the process returns to block 122. When the predetermined percentage of logical ones is in the lower register, the clock time base is advanced at block 146. A predetermined percentage (i.e., second half) the lower register is cleared at block 148. Processing then returns to block 122.

Figure 6:
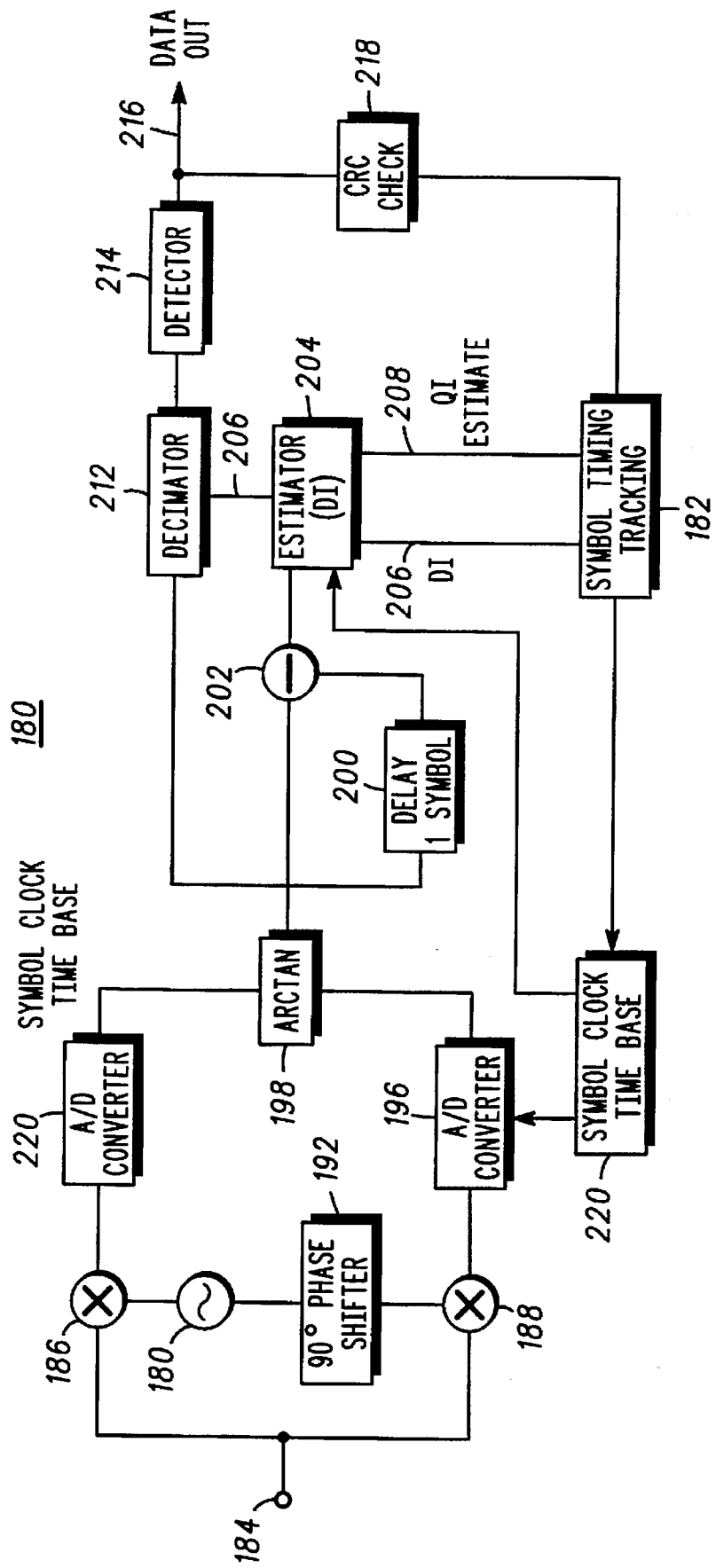
FIG. 6 is a block diagram of a digital receiver.

FIG. 6 is a block diagram of a digital receiver 180 using the apparatus for symbol timing tracking 182. The carrier signal is received through a radio frequency (RF) connection 184. The signal is then split between an in-phase mixer 186 and a quadrature-phase mixer 188. A local oscillator 190 is mixed with the I-phase signal in the 1-phase mixer 186. One output of the local oscillator 190 is connected to a 90 degree phase shifter 192 and then mixed with the Q-phase signal in the Q-phase mixer 188. The down converted I-phase signal is then sampled by an 1-phase analog to digital converter (A/.D) 194. The A/D 194 is clocked by the symbol clock time base at eight times the symbol rate in the preferred embodiment. A Q-phase analog to digital converter 196 samples the down converted Q-phase signal. The outputs of the two A/D's 194, 196 are converted into a phase by an arctan circuit 198. The output of the arctan circuit 198 is a plurality of phase samples. The phase samples are split into three paths. In the first path the phase samples encounter a one symbol delay 200 and then are subtracted, in a subtractor 202, from the undelayed phase samples. The output of subtractor 202 is a plurality of differential phase samples, that are used in an estimator 204 to determine a decimation index 206 and a QI estimate 208. One of a number of process for determining both the decimation index 206 and the QI estimate 208 have already been described earlier. The decimation index 206 and the QI estimate 208 are input to the symbol timing tracking circuit 182.

In the third path of the phase samples from the arctan circuit 198 are decimated by a decimator 212. The decimated phase samples are then passed to a detector 214, that detects the phase samples to obtain the output data 216. The output data 216 is checked by a CRC check circuit 218. The output of the CRC check circuit 218 is connected to the symbol timing tracking circuit 182. The output of the symbol timing tracking circuit 182 is connected to a symbol clock time base 220. The symbol clock time base 220 is connected to the pair of A/Ds 194, 196 and the estimator 204 and controls the sampling rate of the A/Ds 194, 196 and the estimator 204.

Thus there has been described an apparatus and method for symbol timing tracking that does not require the use of a synchronization pattern and can adjust for drifts in the transmitter's or receiver's clock. In addition, the invention does not use noisy or corrupted data to adjust the symbol time base thus avoiding erroneous adjustment of the symbol clock time base. The invention can also track through burst errors when other receiver's would lose timing lock and have to reacquire the clock after the burst errors. Thus resulting in more lost data.

While the invention has been described in conjunction with specific embodiments thereof, it is evident that many alternatives, modifications, and variations will be apparent to those skilled in the art in light of the foregoing description. Accordingly, it is intended the invention embrace all such alternatives, modifications, and variations as fall within the spirit and broad scope of the appended claims.

What is claimed is:

1. An apparatus for adjusting symbol timing tracking, comprising:

(a) an upper threshold limiter receiving a decimation index from an estimator;

(b) an upper shift register coupled to an output of the upper threshold limiter;

(c) a clock enable circuit having an output coupled to the upper shift register, and having an input coupled to a signal quality measure; and (d) a majority vote logic circuit having an input coupled to the upper shift register and having an output coupled to a clock time base to adjust the clock time base and thereby adjust symbol timing tracking.

2. The apparatus of claim 1, further including a clearing logic circuit having an input coupled to the output of the majority vote logic circuit and having an output coupled to the upper shift register.

3. The apparatus of claim 1, further including:

a lower threshold limiter receiving the decimation index from the estimator; and a lower shift register having a first input coupled to the lower threshold limiter and a second input coupled to the output, of the clock enable circuit.

4. The apparatus of claim 3, further including a second majority vote logic circuit having an input coupled to the lower threshold register and an output coupled to the clock time base.

5. The apparatus of claim 1, wherein the signal quality measure comprises one of a cyclical redundancy code (CRC) signal and a carrier impairment measurement.

6. A method for symbol timing tracking, the symbol timing tracking correlated with a clock time base, the method comprising the steps of:

(a) receiving a sampling indicator;

(b) receiving a carrier impairment signal;

(c) receiving a cyclical redundancy code (CRC) signal; and (d) when one of the CRC signal is set and the carrier impairment signal does not meet a quality metric, ignoring the sampling indicator and returning to step (a) without adjustment of the clock time base.

7. The method of claim 6, further including the steps of:

(e) when the sampling indicator is greater than an upper value of the predetermined range, shifting a logical one into an upper threshold register;

(f) when the sampling indicator is less than a lower value of the predetermined range, shifting a logical zero into the upper threshold register; and (g) when less than a predetermined number of a plurality of cells in the upper threshold register contain the logical one, returning to step (a).

8. The method of claim 7, further including the steps of:

(h) when greater than a second predetermined number of the plurality of cells in the upper threshold register contain the logical one, retarding the clock time base;

(i) clearing a third predetermined number of the plurality of cells of the upper shift register; and (j) returning to step (a).

9. The method of claim 6, further including the steps of:

(e) when the sampling indicator is lower than a lower value of the predetermined range, shifting a logical one into a lower threshold register;

(f) when the sampling indicator is greater than an upper value of the predetermined range, shifting a logical zero into the lower threshold register; and (g) when less than a fourth predetermined number of a plurality of cells in the lower threshold register contain the logical one, returning to step (a).

10. The method of claim 9, further including the steps of:

(h) when greater than a fifth predetermined number of the plurality of cells in the lower threshold register contain the logical one, advancing the clock time base;

(i) clearing a sixth predetermined number of the plurality of cells of the lower threshold register; and (j) returning to step (a).

* * * * *